(12) United States Patent
Miyazaki

(10) Patent No.: US 7,422,043 B2
(45) Date of Patent: Sep. 9, 2008

(54) PNEUMATIC TIRE WITH TREAD HAVING CIRCUMFERENTIAL SUB-GROOVES INCLUDING AT LEAST THREE RAISED PORTIONS

(75) Inventor: Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 170 days.

(21) Appl. No.: 11/184,172

(22) Filed: Jul. 19, 2005

(65) Prior Publication Data

US 2006/0016538 A1 Jan. 26, 2006

(30) Foreign Application Priority Data

Jul. 20, 2004 (JP) .............................. 2004-211642

(51) Int. Cl.
*B60C 11/11* (2006.01)
*B60C 11/13* (2006.01)

(52) U.S. Cl. .............................. 152/209.22; 152/209.27; 152/DIG. 3; 152/902

(58) Field of Classification Search ............ 152/209.18, 152/209.22, 209.27, DIG. 3, 902
See application file for complete search history.

(56) References Cited

U.S. PATENT DOCUMENTS

| | | | | |
|---|---|---|---|---|
| 3,727,661 A | * | 4/1973 | Hoke | 152/209.22 |
| 5,088,536 A | * | 2/1992 | Graas et al. | 152/209.22 |
| 5,439,040 A | * | 8/1995 | Iwamura et al. | 152/209.22 |
| 5,824,169 A | * | 10/1998 | Landers et al. | 152/DIG. 3 |
| 6,050,313 A | * | 4/2000 | Tsuda | 152/209.22 |
| 6,105,643 A | * | 8/2000 | Rohweder et al. | 152/209.22 |
| 6,220,322 B1 | * | 4/2001 | Matsuura | 152/209.22 |
| 2006/0016536 A1 | * | 1/2006 | Maxwell et al. | 152/209.18 |

FOREIGN PATENT DOCUMENTS

| | | | |
|---|---|---|---|
| JP | 62-4608 | | 1/1987 |
| JP | 62-004610 | * | 1/1987 |
| JP | 63-125410 | | 5/1988 |
| JP | 02-128907 | * | 5/1990 |
| JP | 03-014704 | * | 1/1991 |
| JP | 5-169922 | | 7/1993 |
| JP | 8-207515 | | 8/1996 |

* cited by examiner

*Primary Examiner*—Steven D Maki
(74) *Attorney, Agent, or Firm*—Knobbe Martens Olson & Bear, LLP

(57) ABSTRACT

A pneumatic tire is provided, where the rigidity of the blocks formed on the tread surface is increased and an increase in the level of noise when the tread surface is worn can be prevented. In a pneumatic tire where a number of blocks which are separated by a number of grooves are formed on tread surface, these grooves comprise main grooves that extend along the direction around the tire, or across the direction around the tire, sub-grooves that extend so as to connect to these main grooves, a pair of first raised bottom portions formed in the vicinity of the two ends of each portion of sub-groove which separates blocks, and at least one second raised bottom portion that is formed between each pair of the first raised bottom portions.

14 Claims, 3 Drawing Sheets

(a)

(b)

PNEUMATIC TIRE WITH TREAD HAVING CIRCUMFERENTIAL SUB-GROOVES INCLUDING AT LEAST THREE RAISED PORTIONS

BACKGROUND OF THE INVENTION

1. Field of the Invention

The present invention relates to a pneumatic tire, where a raised bottom portion is provided in a groove created on the tread surface.

2. Description of the Related Art

In general, a variety of tread patterns are formed on the tread surface of pneumatic tires, in accordance with required tire functions and conditions for use. In particular, a tread pattern which is referred to as a block type has a number of blocks separated by grooves, and it is known that the pattern has excellent performance on snowy roads, excellent water dispersing performance and excellent traction. There is a problem, however, where the blocks separated by grooves have a relatively low rigidity and irregular wear easily occurs on the tread surface. This problem is shared by other pneumatic tires where block type patterns are formed, and in particular, is significant in studless tires where a great number of sipes are created in the blocks.

For this reason, pneumatic tires where raised bottom portions are provided to the grooves on the tread surface have been proposed in the following Specification of Japanese Patent 3116243, Japanese Unexamined Patent Publication 62-4608(1987) and Japanese Unexamined Patent Publication 63-125410(1988). Those pneumatic tires are provided with raised bottom portions in the corners where the rigidity is relatively low in the blocks, and thereby, the rigidity of the blocks can be increased, restricting the occurrence of irregular wear. In the above described configurations, however, closed spaces surrounded by the raised bottom portions are created so as to have a length that corresponds to the pitch of the pattern on the tread surface. As a result of this, when the tread surface is worn to the point where the raised bottom portions make contact with the ground, in some cases, the frequency band of the pumping sound which is emitted by the compression and release of air within a closed space that faces the road surface becomes close to pitch noise, and a problem arises where the pumping sound resonates with the pitch noise, increasing the level of noise.

Here, though the below described Specification of Japanese Patent 3511413 also discloses a pneumatic tire where raised bottom portions (protrusions) are provided in the grooves on the tread surface, these raised bottom portions give a warning that the tread surface is in the last phase of wearing by means of a pumping sound, and the rigidity of the blocks is not sufficiently increased. In addition, the raised bottom patterns are provided on both sides of the grooves, and thereby, closed spaces are created so as to have a length that corresponds to the pitch of the pattern on the tread surface, and therefore, in some cases, a pumping sound resonates with pitch noise in the same manner as described above, increasing the level of noise.

SUMMARY OF THE INVENTION

An object of the present invention is to provide a pneumatic tire where the rigidity of the blocks which are formed on the tread surface is increased, and the level of noise can be prevented from increasing when the tread surface is worn.

The above described object can be achieved by providing the following configuration according to the present invention. Namely, a pneumatic tire of the present invention is a pneumatic tire where a number of grooves and a number of blocks separated by the grooves are created on the tread surface, wherein the above described grooves comprise: main grooves which extend along or across the direction around the tire; sub-grooves which extend so as to connect the main grooves; pairs of first raised bottom portions formed in the vicinity of both ends of portions in the above described sub-grooves that separate the above described blocks; and at least one second raised bottom portion formed between each pair of the first raised bottom portions.

According to the configuration of the present invention, pairs of first raised bottom portions are formed in the vicinity of both ends of the portions of the sub-grooves that separate the blocks, and thereby, corners in the blocks which have a relatively low rigidity are effectively reinforced, and the occurrence of irregular wear can be restricted. In addition, second raised bottom portions are formed between the first raised bottom portions, and thereby, the closed spaces surrounded by the first raised bottom portions can be divided. As a result of this, the closed spaces are not created so as to correspond to the pitch of the pattern on the tread surface, shifting the frequency band of the pumping sound which is emitted when the tread surface is worn from that of the pitch noise, so that an increase in the level of noise can be prevented by avoiding resonance.

In the above description, it is preferable for only one second raised bottom portion to be formed between each of the above described pairs of first raised bottom portions, and for L1/L to be in a range from 0.2 to 0.8, where L is the distance between each pair of the first raised bottom portions and L1 is the distance between the center of the above described second raised bottom portion and one of the above described first raised portions.

In the above described configuration, two closed spaces are created in one space surrounded by the first raised bottom portions, and these two closed spaces are respectively secured to have appropriate volumes. As a result of this, the pumping sound emitted from the closed spaces can be dispersed without fail, the pumping sound can be effectively prevented from resonating with the pitch noise, and an increase in the level of noise can be prevented.

In addition, in the above description, it is preferable for the distance between one of the first raised bottom portions and the center of the second raised bottom portion that faces this first raised bottom portion to be different from the distance between the center of this second raised bottom portion and the other of the first raised bottom portions that face this second raised bottom portion, or different from the distance between the center of this second raised bottom portion and the center of the above-mentioned second raised bottom portion that faces this second raised bottom portion.

In the above described configuration, the volumes of the closed spaces formed between a first raised bottom portion and a second raised bottom portion, as well as between second raised bottom portions, can be made different. As a result of this, the frequency bands of the pumping sound that is emitted from these closed spaces can be shifted from each other so that the level of noise is effectively reduced.

DESCRIPTION OF THE PREFERRED EMBODIMENTS

In the following, the embodiments of the present invention are described in reference to the drawings. A pneumatic tire of the present invention has the same tire structure as in the prior art, except for the tread surface, and has the same structure as shown, for example, in FIG. 1.

Figure 1:
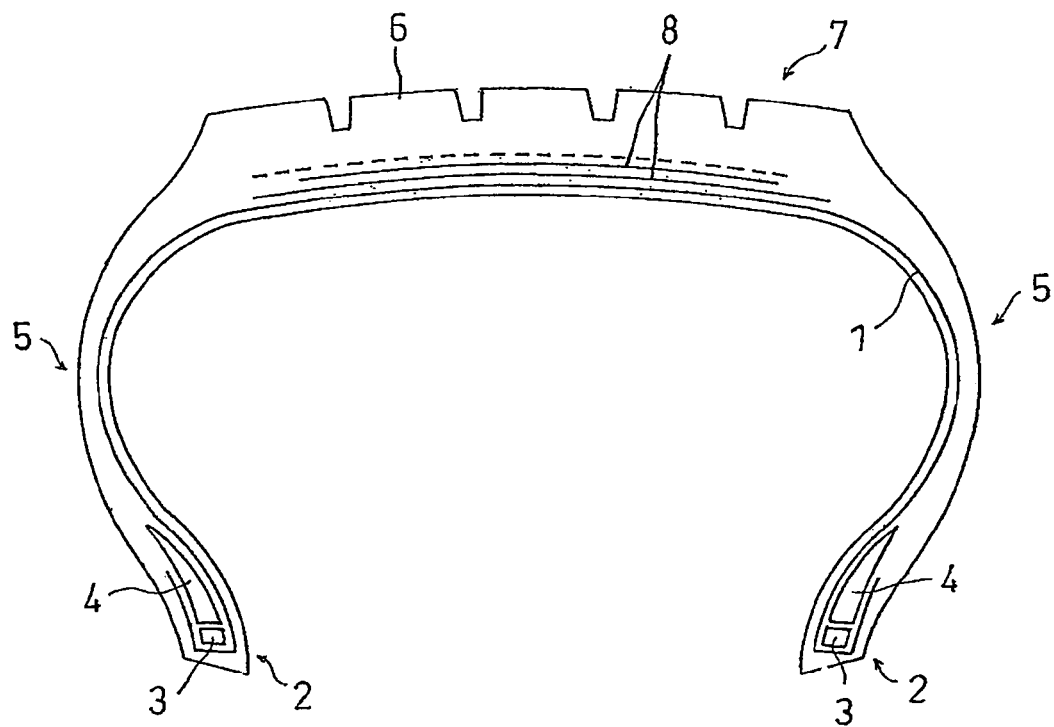
FIG. 1 is a cross-sectional view along the meridian of a tire which is an example of a pneumatic tire according to the present invention.

The pneumatic tire shown in FIG. 1 comprises: a pair of annular bead portions 2; sidewall portions 5 which respectively extend from these bead portions 2 toward the outer periphery of the tire; and a tread portion 7 which continues to the respective outer peripheral ends of these sidewall portions 5 through shoulder portions. A carcass ply 1 is provided so as to bridge bead portions 2, and the end portions of carcass ply 1 are curled so as to wrap around beads 3 and bead fillers 4. One or more belt layer 8 is provided outside of carcass ply 1 in tread portion 7, and a belt reinforcing layer is also provided, if necessary. A tread rubber is provided on belt layers 8 on the outer periphery of the tire, and a variety of tread patterns is created on tread surface 6, in accordance with the required tire performance and conditions for use.

In the above description, a natural rubber, styrene butadiene rubber (SBR), butadiene rubber (BR), isoprene rubber (IR), butyl rubber (IIR) and the like can be cited as material rubbers for the rubber layers, and one of these may be utilized by itself, or two or more types may be mixed for use. In addition, these rubbers are enforced with fillers such as carbon black or silica, and a vulcanizer, a vulcanization accelerator, a plasticizer, an antioxidant and the like are appropriate for mixing with these rubbers.

Figure 2:
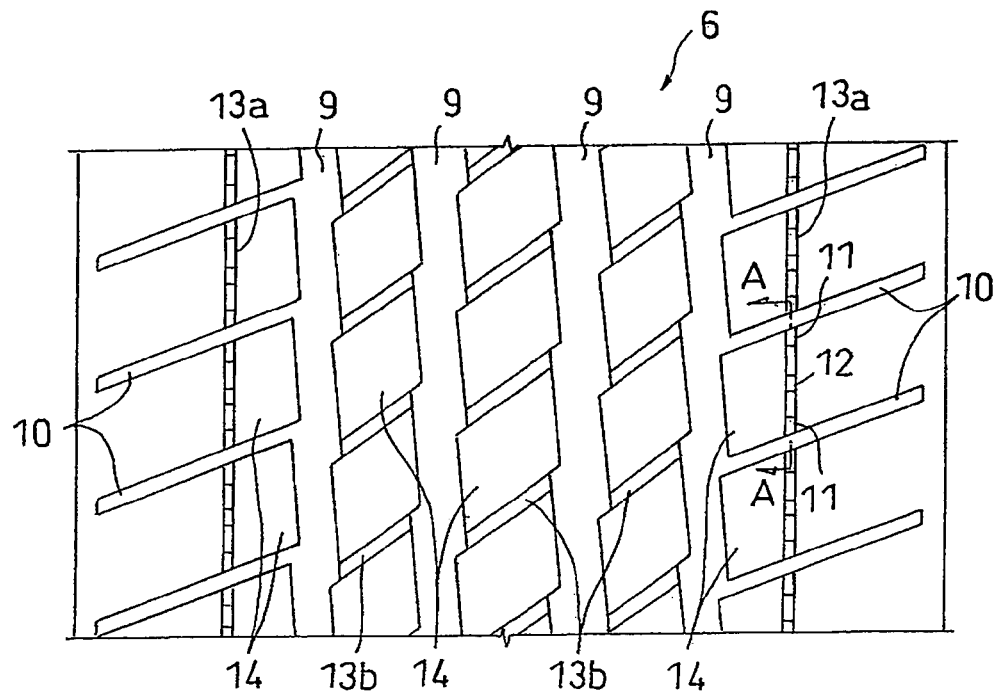
FIG. 2 is a plan view of a tread portion of the pneumatic tire according to the present invention.
Figure 3:
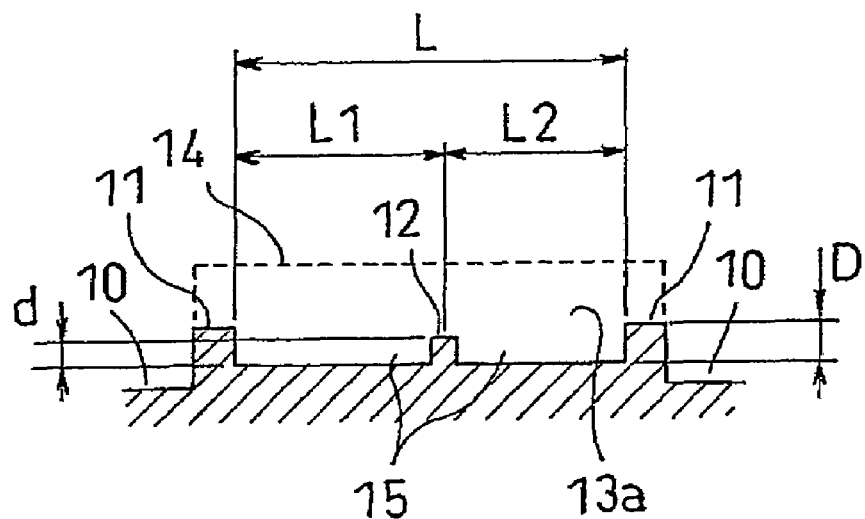
FIG. 3 is a cross-sectional view along A-A of FIG. 2.

In the following, the tread surface of a pneumatic tire according to the present invention is described. FIG. 2 is a plan view of the tread portion provided with a pneumatic tire of the present invention. FIG. 3 is a cross-sectional view along line A-A of FIG. 2.

The tread pattern formed on the tread surface of the pneumatic tire of the present invention is a so-called block type pattern which has a number of grooves and a number of blocks separated by the grooves. In addition, the grooves are divided into main grooves and sub-grooves.

Four grooves 9 around the tire which extend along the direction around the tire and diagonal grooves 10 which extend diagonally relative to the direction around the tire from grooves 9 around the tire on both sides in the direction of the width toward the shoulder portions are created on tread surface 6 shown in FIG. 2. These grooves 9 around the tire and diagonal grooves 10 correspond to the above described main grooves. Sub-grooves 13a are shallower than diagonal grooves 10 and continue to diagonal grooves 10, extending in the direction around the tire. In addition, sub-grooves 13b are shallower than grooves 9 around the tire, and continue to grooves 9 around the tire, extending diagonally relative to the direction around the tire. Sub-grooves 13a and 13b are illustrated as grooves having widths between 1 mm and 8 mm. Blocks 14 are separated by the grooves so as to form parallelograms, and are aligned with a predetermined pitch along the direction around the tire. The pitch of the tread pattern is illustrated as one having 40 to 80 blocks in a line around the tire.

In the present embodiment, as shown in FIG. 3, a pair of raised bottom portions 11 (which corresponds to the above described first raised bottom portions) are formed in a sub-groove 13a. Raised bottom portions 11 are formed in the vicinity of the two ends of the portion that separates block 14 of sub-groove 13a. As a result of this, the corners of block 14 are reinforced so that the occurrence of irregular wear can be restricted. A raised bottom portion 12 (which corresponds to the above described second raised bottom portion) is formed in the vicinity of the center between raised bottom portions 11. As a result of this, two closed spaces 15, of which the surroundings are closed by raised bottom portions 11 and raised bottom portion 12, are provided.

Therefore, in contrast to a case where closed spaces created only by a pair of raised bottom portions 11 are aligned with a predetermined pitch so as to correspond to the pitch of the pattern, creation of closed spaces 15 corresponding to the pitch of the pattern can be avoided by the formation of raised bottom portion 12 between raised bottom portions 11 dividing the space between first raised bottom portions 11. Consequently, when tread surface 6 is worn to a point where raised bottom portions 11 make contact with the ground, the pumping sound emitted from closed spaces 15 does not resonate with the pitch noise, preventing an increase in the level of noise.

In the present invention, it is preferable for one raised bottom portion 12 to be formed between each pair of raised bottom portions 11, and for L1/L to be from 0.2 to 0.8, where L is the distance between raised bottom portions 11 and L1 is the distance between the center of raised bottom portion 12 and one raised bottom portion 11. Here, L and L1 are measured relative to the standard of the respective ends on the inner sides in the longitudinal direction of a sub-groove between the upper surfaces of raised bottom portions 11. In the case where L1/L is less than 0.2 or exceeds 0.8, closed spaces 15 created by raised bottom portions 11 and raised bottom portion 12 are provided with one closed space 15 exceedingly greater than the other, making no difference from the case where the closed spaces are created corresponding to the pitch, and therefore, the effects of preventing an increase in the level of noise tend to become small. Here, an example where distance L between raised bottom portions 11 is between 20 mm and 50 mm is shown.

In addition, it is preferable for distance L1 and distance L2 to be different from each other, where L2 is the distance between the center of raised bottom portion 12 and the other raised bottom portion 11. As a result of this, the volumes of respective closed spaces 15 can be made different from each other, and thereby, the frequency bands of the pumping sound emitted from these closed spaces 15 can be shifted from each other, more effectively restricting the level of noise. Here, in the case where distance L2 is smaller than distance L1, it is preferable for L2/L1 to be between 0.25 and 0.95, and it is more preferable for L2/L1 to be between 0.25 and 0.75.

It is preferable for the height of raised bottom portion 12 to be no greater than that of raised bottom portions 11, and it is preferable for height D of raised bottom portions 11 relative to the reference of the bottom of sub-groove 13a and height d of raised bottom portion 12 relative to the same reference to satisfy $0.4 \leq d/D \leq 1.0$. Furthermore, it is preferable for the height of raised bottom portion 12 to be lower than that of raised bottom portions 11, and thus, it is more preferable for d and D to satisfy $0.6 \leq d/D < 1.0$. As a result of this, flow of water in sub-groove 13a becomes better, and water dispersing properties can be enhanced, enhancing wet performance. Here, in the case where d/D is less than 0.4, the height of raised bottom portion 12 becomes too low, and the effect of preventing an increase in the level of noise tend to become smaller. An example where height D of raised bottom portions 11 is between 3 mm and 8 mm is shown.

Figure 4:
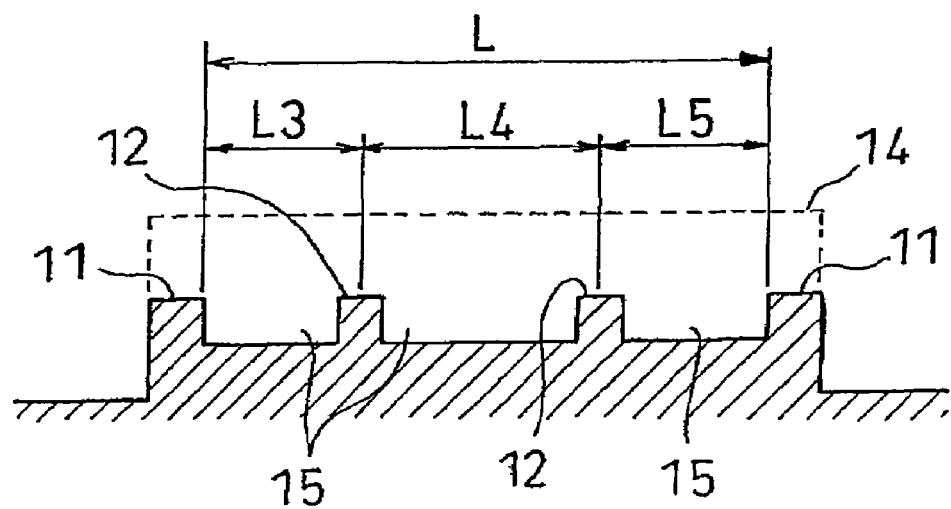
FIG. 4 is a cross-sectional view of a portion of the tread surface of a pneumatic tire according to another embodiment.

According to the present invention, at least one raised bottom portion 12 may be formed between each pair of raised bottom portions 11, and, as shown in FIG. 4, for example, two or more raised bottom portions 12 may be formed between raised bottom portions 11. In such a case, the number of raised bottom portions 12 is not particularly limited. In addition, it is preferable for respective distances L3 to L5 between raised bottom portions 11 and 12 to be no less than 0.2L relative to distance L between raised bottom portions 11. As a result of this, the respective closed spaces 15 can be secured, and the pumping sound emitted from closed spaces 15 can be effectively dispersed.

Furthermore, it is preferable for distance L3 or L5 between one of raised bottom portions 11 and the center of raised bottom portion 12 which faces this raised bottom portion 11, and distance L4 between the center of this raised bottom portion 12 and the center of raised bottom portion 12 which faces this raised bottom portion 12 to be different from each other. As a result of this, the frequency bands of the pumping sound can be shifted from each other, and the level of noise can be more effectively restricted.

Here, distances L3 to L5 may be equal to each other.

OTHER EMBODIMENTS (1) The tread pattern formed on the tread surface of a pneumatic tire according to the present invention is not limited to the one shown in the above described embodiment, and the pitch of the pattern and the form of the blocks are also not particularly limited. Furthermore, the width, the length, the depth and the form in the cross-section of sub-grooves where raised bottom portions are formed are not particularly limited.

Figure 5:
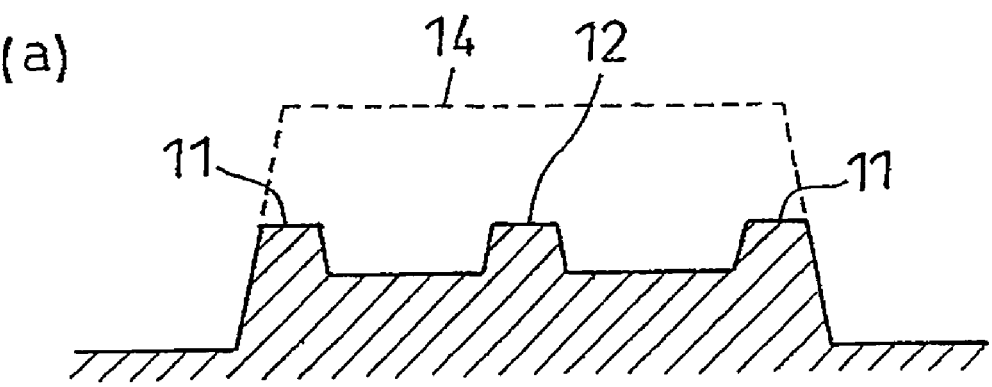
FIG. 5 is a cross-sectional view of a portion of the tread surface of a pneumatic tire according to another embodiment.
Figure 5:
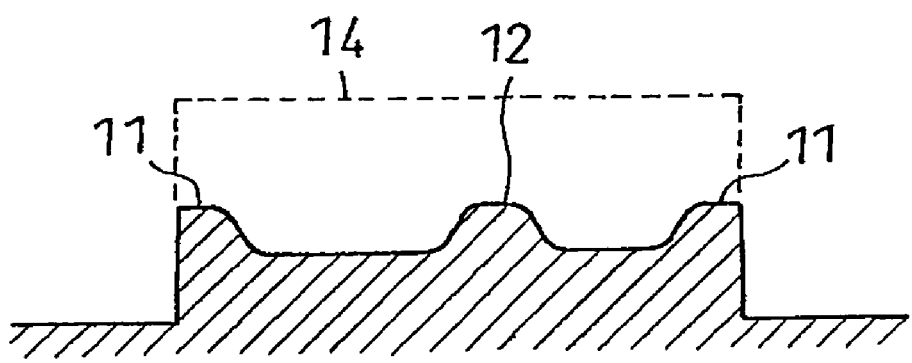

(2) Though in the above described embodiment, examples where the blocks and raised bottom portions have rectangular forms in cross-sections are shown, the present invention is not limited to these. As shown in FIG. 5(a), for example, blocks 14 and raised bottom portions 11 and 12 may have trapezoids in cross-sections, or, as shown in FIG. 5(b), raised bottom portions 11 and 12 may have forms with curved feet.

(3) Though in the above described embodiment, examples where raised bottom portions 12 are provided to sub-grooves 13a which extend in the direction around the tire are shown, the present invention is not limited to these. In FIG. 2, for example, raised bottom portions 11 and 12 may be provided to sub-grooves 13b which extend diagonally relative to the direction around the tire. In addition, raised bottom portions may be provided to sub-grooves which extend in the direction perpendicular to the direction around the tire. In such a case, the closed spaces are divided by the raised bottom portions so as to have smaller volumes, and thereby, the effect of dispersing the pumping sound can be gained.

EXAMPLES

In the following, examples which concretely illustrate the configuration and effects of the present invention are described.

(1) Noise Test

Test tires of which the tread surfaces were worn to a point where raised bottom portions 11 make contact with the ground were mounted on a car (four wheel drive, 2000 cc, with two passengers), and noise when the car was running was subjected to sensory evaluation by the two passengers.

Here, the air pressure of the tires was 210 kPa, and noise at a running speed of 40 km/h to 100 km/h was evaluated. An exponential evaluation relative to a comparison example of 100 was carried out, where the greater the numeral value is, the smaller the noise is, that is to say, the greater the effects of restricting the level of noise is.

(2) Wet Performance Test

Test tires of which the tread surfaces were worn to a point where raised bottom portions 11 make contact with the ground were mounted on a car (four wheel drive, 2000 cc, with two passengers), and response when the steering wheel was turned while driving on a wet road was subjected to sensory evaluation by the two passengers. Here, the pressure of the tires was 210 kPa. An exponential evaluation relative to a comparison example of 100 was carried out, where the higher the numeral value is, the better the response is, that is to say, the more excellent wet performance is.

Comparison Example

Test tires (of which the size is 225/70 R16) where the pattern shown in FIGS. 2 and 3 is formed on the tread surface were manufactured. Here, though raised bottom portions 11 were formed in sub-grooves 13a, no raised bottom portions 12 were provided to the configuration. Sub-grooves 13a had a width of 2 mm, and raised bottom portions 11 had a length of 3 mm and height D of 5 mm. In addition, distance L between raised bottom portions 11 was 29 mm.

Examples 1 and 2

The same structure as that of the comparison example was provided, except for that raised bottom portions 11 were formed in sub-grooves 13a in a manner where one raised bottom portion 12 was formed between each pair of raised bottom portions 11. Here, raised bottom portions 12 had a length of 2 mm, and depth d and distances L1 and L2 as shown in Table 1.

The respective dimensions of the comparison example and examples 1 and 2 are shown in Table 1, and the evaluation results of the above described items are shown in Table 2.

TABLE 1

|  | L | L1 | L2 | D | d |
|---|---|---|---|---|---|
| Comparison example | 29 | — | — | 5 | — |
| Example 1 | 29 | 14.5 | 14.5 | 5 | 5 |
| Example 2 | 29 | 16.5 | 12.5 | 5 | 4 |

(unit: mm)

TABLE 2

|  | Noise | Wet performance |
|---|---|---|
| Comparison example | 100 | 100 |
| Example 1 | 110 | 98 |
| Example 2 | 112 | 100 |

According to the results of Table 2, Example 1 exhibits noise that is smaller than that of the comparison example, and this is considered that the pumping sound is prevented from resonating with the pitch noise through the formation of raised bottom portions 12 between raised bottom portions 11, resulting in the prevention of an increase in the level of noise. In addition, Example 2 exhibits noise that is smaller still than that of example 1, and therefore, it can be seen that the level of noise can be more effectively restricted by making distances L1 and L2 different from each other. In addition, the wet performance is improved in comparison with Example 1, and it can be seen that the water dispersing properties have been improved by making the height of raised bottom portions 12 lower than that of raised bottom portions 11.

What is claimed is:

1. A pneumatic tire having a tread surface comprising:
    main grooves extending in a circumferential direction of the tire and across the direction;
    sub-grooves extending in the circumferential direction of the tire and optionally across the direction to connect with the main grooves, said sub-grooves having a depth which is shorter than that of the main grooves; and
    blocks separated and defined by the main grooves and the sub-grooves,
    wherein each sub-groove extending in the circumferential direction and separated by the main grooves has a bottom with two ends in the circumferential direction, on which bottom (i) two first raised portions are formed in the vicinity of the respective two ends of the bottom, and (ii) at least one second raised portion formed between the two first raised portions,
    wherein the at least one second raised portion is only one second raised portion, and L1/L is in a range of 0.2 to 0.8, where L is a distance between the two first raised portions and L1 is a distance between a center of the second raised portion and one of the two first raised portions,
    wherein the distance L1 is different from a distance L2 which is a distance between the other of the two first raised portions and the center of the second raised bottom portion.

2. The pneumatic tire according to claim 1, wherein L2/L1 is 0.25 to 0.95.

3. The pneumatic tire according to claim 1, wherein the sub-grooves extending in the circumferential direction connect with the main grooves extending across the circumferential direction.

4. The pneumatic tire according to claim 1, wherein the first raised portion has a height D and the second raised portion has a height d, wherein $0.4 \leq d/D \leq 1.0$.

5. The pneumatic tire according to claim 4, wherein the first raised portion has a height D and the second raised portion has a height d, wherein $0.6 \leq d/D < 1.0$.

6. The pneumatic tire according to claim 1, wherein a distance between the two first raised portion is 20-50 mm, and a width of the sub-grooves extending in the circumferential direction is 1-8 mm.

7. The pneumatic tire according to claim 1, wherein the sub-grooves extending in the circumferential direction are provided in the vicinity of side edges of the tread surface.

8. A pneumatic tire having a tread surface comprising:
    main grooves extending in a circumferential direction of the tire and across the direction;
    sub-grooves extending in the circumferential direction of the tire and optionally across the direction to connect with the main grooves, said sub-grooves having a depth which is shader than that of the main grooves; and
    blocks separated and defined by the main grooves and the sub-grooves,
    wherein each sub-groove extending in the circumferential direction and separated by the main grooves has a bottom with two ends in the circumferential direction, on which bottom (i) two first raised portions are formed in the vicinity of the respective two ends of the bottom, and (ii) at least one second raised portion formed between the two first raised portions,
    wherein the at least one second raised portion is two or more second raised portions, and distances between one of the two first raised portions and a center of the second raised portion adjacent thereto, between centers of any one pair of adjacent second raised portions, and between the other of the two first raised portions and a center of the second raised portion adjacent thereto are different.

9. The pneumatic tire according to claim 8, wherein the sub-grooves extending in the circumferential direction connect with the main grooves extending across the circumferential direction.

10. The pneumatic tire according to claim 8, wherein the first raised portion has a height D and the second raised portion has a height d, wherein $0.4 \leq d/D \leq 1.0$.

11. The pneumatic tire according to claim 10, wherein the first raised portion has a height D and the second raised portion has a height d, wherein $0.6 \leq d/D < 1.0$.

12. The pneumatic tire according to claim 8, wherein a distance between the two first raised portion is 20-50 mm, and a width of the sub-grooves extending in the circumferential direction is 1-8 mm.

13. The pneumatic tire according to claim 8, wherein the sub-grooves extending in the circumferential direction are provided in the vicinity of side edges of the tread surface.

14. The pneumatic tire according to claim 8, wherein the at least one second raised portion is two second raised bottom portions.

* * * * *